(12) United States Patent
Laitala et al.

(10) Patent No.: US 6,569,339 B1
(45) Date of Patent: May 27, 2003

(54) METHOD FOR REDUCING THE SIZE OF SOLVENT EXTRACTION PROCESS STEPS AND CELL FOR USING IN THE SOLVENT EXTRACTION PROCESS

(75) Inventors: Hannu Laitala, Kauniainen (FI); Sipilä Jussi, Espoo (FI)

(73) Assignee: Outokumpu Oyj, Espoo (FI)

( * ) Notice: Subject to any disclaimer, the term of this patent is extended or adjusted under 35 U.S.C. 154(b) by 0 days.

(21) Appl. No.: 09/807,681

(22) PCT Filed: Oct. 19, 1999

(86) PCT No.: PCT/FI99/00860

§ 371 (c)(1),
(2), (4) Date: Jun. 25, 2001

(87) PCT Pub. No.: WO00/25882

PCT Pub. Date: May 11, 2000

(30) Foreign Application Priority Data

Oct. 29, 1998 (FI) .................................................. 982354

(51) Int. Cl.⁷ .............................................. B01D 11/00
(52) U.S. Cl. ........................ 210/634; 210/511; 422/258; 422/259
(58) Field of Search ................................. 210/511, 513, 210/634, 800; 422/256, 258, 259; 366/262, 290, 292; 423/24

(56) References Cited

U.S. PATENT DOCUMENTS

| 1,297,171 A | * | 3/1919 | Holley et al. |
| 4,292,277 A | * | 9/1981 | Bonney et al. .............. 210/511 |
| 4,391,711 A | | 7/1983 | Jackson et al. .............. 210/634 |
| 5,185,081 A | | 2/1993 | Nyman et al. .............. 210/634 |
| 5,290,433 A | * | 3/1994 | Chan et al. .................. 422/259 |
| 5,662,871 A | | 9/1997 | Nyman et al. .............. 422/259 |

* cited by examiner

Primary Examiner—Joseph Drodge
(74) Attorney, Agent, or Firm—Morgan & Finnegan LLP

(57) ABSTRACT

A method and cell for reducing the size of a solvent extraction process in which a series of cells are arranged in an extraction process. The process includes the use of conventional settlers at the beginning and at the end of the extraction process with at least one reduced-size extraction cell in the middle of the extraction process.

14 Claims, 2 Drawing Sheets

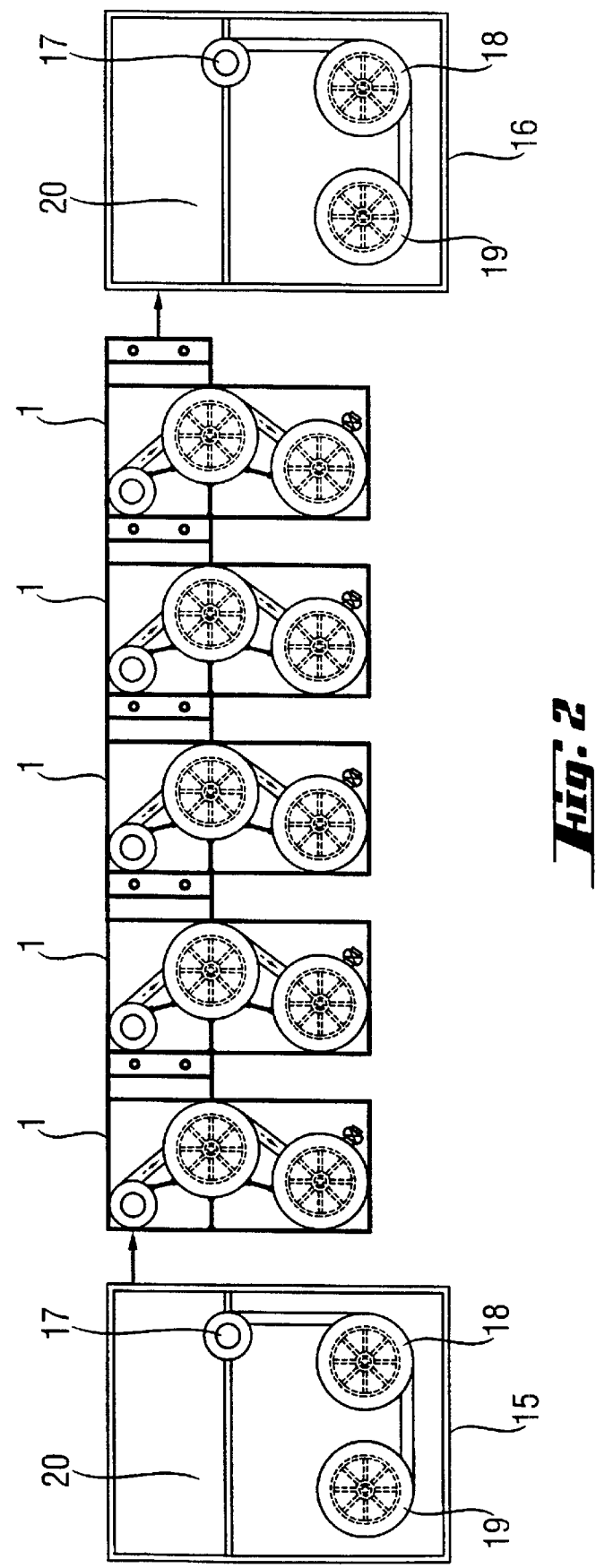

Figure 1:
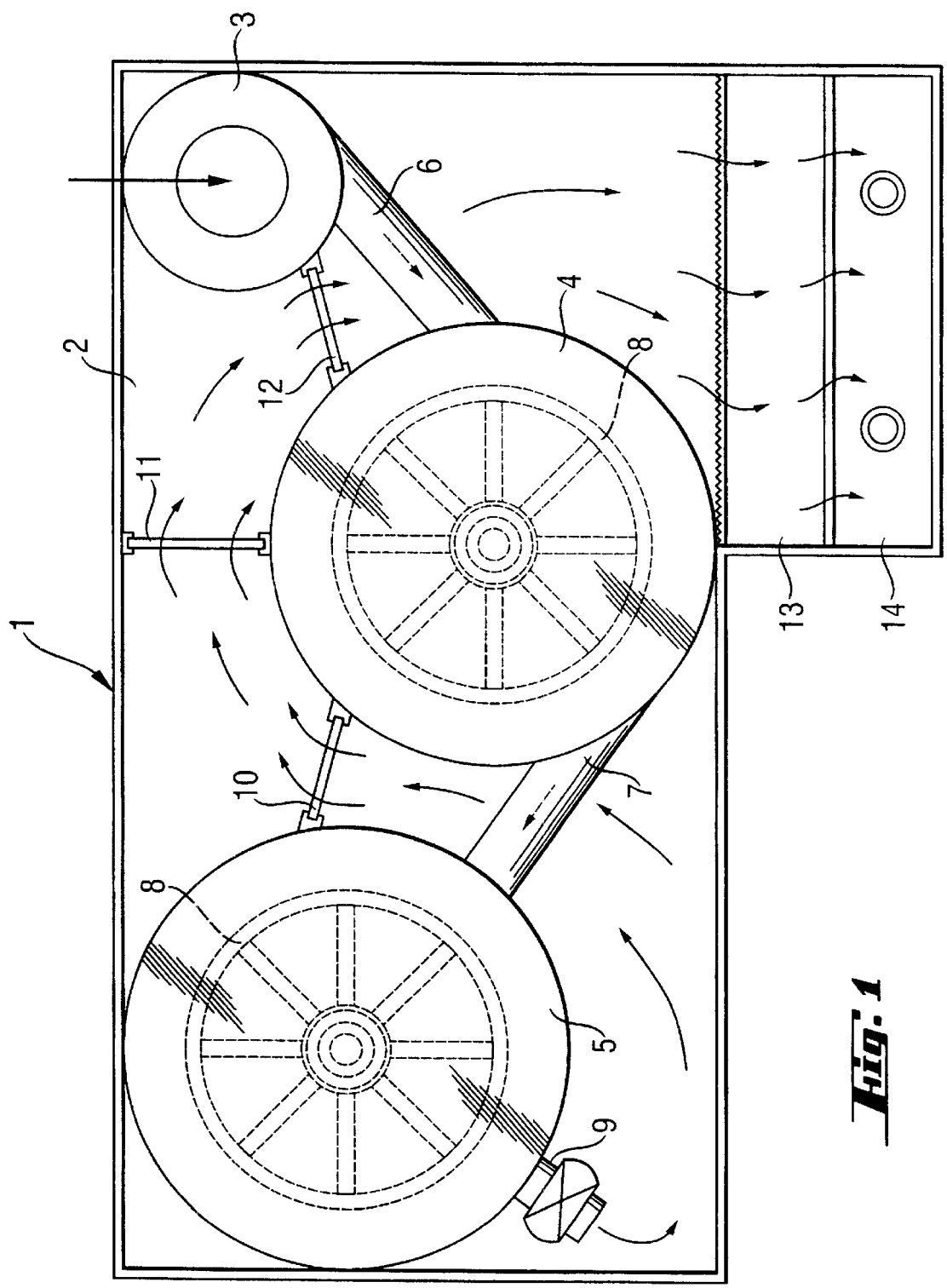

METHOD FOR REDUCING THE SIZE OF SOLVENT EXTRACTION PROCESS STEPS AND CELL FOR USING IN THE SOLVENT EXTRACTION PROCESS

This Application is a United States national stage under 35 U.S.C. §371 of PCT/FI99/00860, filed on Oct. 19, 1999.

The method described in the present invention is for reducing the size of the steps in the solvent extraction process, whereby the reduction occurs by decreasing the size of the middle cells of the extraction step. The invention also focuses on the cells used in the solvent extraction step.

Liquid-liquid solvent extraction is often used as a part of the hydro-metallurgical production of metals. The solvent extraction process usually consists of several stages or steps, where for instance pre-extraction, extraction, re-extraction etc. take place. Each extraction step contains several extraction cells, in each of these generally has a pump unit, which transfers the liquid phases of the extraction from one cell to another; one or several mixing units i.e. a mixer; and a settling unit behind the mixer i.e. a settler, where the liquids dispersed in the mixer settle into their own phases by force of gravity. A pump may also be combined with a mixer, so that the mixer also functions as a pumping device. In the reactions that occur during the solvent extraction process, one or more metals move from one phase (generally the aqueous phase) to another (organic) phase and can then be separated using re-extraction. The function of the extraction cells is to provide good conditions for the progression of the extraction reactions and finally to separate the liquids from each other.

The construction of the solvent extraction process varies considerably depending on which metal is being extracted. Copper extractions are usually fairly simple in that they only consist of a few extraction and re-extraction steps, but on the other hand, the size of copper extraction cells has grown enormously with time, which imposes its own limits on the extraction. The extraction processes of other metals are, however, much more complicated as far as the quantity of steps is concerned, although their capacity is a fraction of the amount of copper produced in an extraction plant.

In the solvent extraction cells used at present, almost all the afore-mentioned components are present: a pump, one or several mixers, an optional pre-settler and the main settler. The phases being mixed are pumped from one cell to another, where they disperse, any mixing and reaction time required for transferring of metal ions from one phase to another occurs in the mixer and the pure phases are separated from each other in the settler. These methods are described for example in U.S. Pat. Nos. 5,185,081 and 5,662,871. Within the extraction steps, all the extraction cells are similar, i.e. the separating capacity of phases is optimal in all cells.

U.S. Pat. No. 4,391,711 describes a solvent extraction arrangement, comprising one chamber, into the center of which the dispersing phases are conducted under a mixer. The space surrounding the mixer forms a dispersion band, above which there is space for the lighter phase separating from the band and under, space for the heavier phase separating from the band. In this arrangement, there is actually no traditional settler unit at all. The extraction cells within the extraction step and in different steps of the extraction process are all similar.

A new method for reducing the size of solvent extraction process stages has been developed, where, as stated earlier, there are many extraction steps, especially in the solvent extraction of other metals than copper, and where there are many similar cells within the step. The guiding principle here is that the good separation capacity of the phases is important, especially in the first and last cell of the extraction step. However, within the step, a greater amount of residual droplets is allowed, wherein the size of the extraction step is reduced by decreasing the size of the cells within the step. This occurs by deacreasing the settler unit of the cells within the step and replacing it with a more compact solution, wherein the cross-section area of the settler unit of at least one cell or preferably all cells in the middle of the extraction step is at most half of the cross-section area of the first and last settler unit in the step. According to the present invention, the settler unit of the extraction cell comprises a pump unit and a settler unit located around the mixers. The profile of the settling unit is preferably rectangular. The essential features of the invention will become apparent in the attached patent claims.

In the method developed, the size of the extraction steps is reduced, which in practice means that the process fits into a smaller space than a conventional process arrangement. In addition, savings are made in investment costs and the need for solvent extraction chemicals is also reduced. An additional benefit worth mentioning is that the amount of capital tied up in the process will also decrease.

A solvent extraction step and an extraction cell used within the step according to the present invention, are described in more detail in the attached diagrams wherein FIG. 1 shows a solvent extraction cell according to the present invention as seen from a top, and FIG. 2 shows a solvent extraction step arrangement according to the present invention as seen from the top.

FIG. 1 shows that a solvent extraction cell 1 according to the present invention comprises an essentially rectangular-shaped settler 2, in which a pump unit 3 is located and in this case two mixers 4 and 5. Naturally, there may be only one mixer or more than two. If there is only one mixer, the settler can be almost square. As mentioned earlier, the mixer unit may also function as a pump unit, in which case the separate pump may be left out. The liquids to be mixed are conducted (not shown in the diagram) to the pump unit 3, which may be some device of the prior art such as for example the DOP overflow pump described in U.S. Pat. No. 5,622,871. A dispersion of pump unit 3, which may be some device of the prior art such as for example the DOP overflow pump described in U.S. Pat. No. 5,622,871. A dispersion of the liquids is conducted from the pump unit through a conduit 6 to the first mixer 4 and from there through a second conduit 7 to the second mixer 5.

The mixers are equipped with impellers 8 and their rotation speed is selected so that the dispersion does not emulsify. This kind of mixing apparatus is described in e.g. U.S. Pat. No. 5,185,081. A well-mixed dispersion of phases is conducted from the last mixer through a discharge outlet 9 into the settler space surrounding the mixer and the pump unit, wherein the dispersion flows first onwards from the last mixer to the pump unit so that the dispersion flows through at least one, preferably through several picket fences 10, 11 and 12.

The first of the picket fences is in this case supported between the walls of the two mixers, the second in the wall of the first mixer and the settler, and the third is located between the first mixer and the overflow pump. The picket fence can of course also be positioned elsewhere, e.g. between the mixer 5 and the wall of the settler 2. The picket fences promote the settling of the phases. The phases are removed through discharge chutes, of which the lighter phase extraction liquid chute 13 comes first in the flow direction and the aqueous solution chute 14 behind it. The solutions are removed from the chutes and conveyed onwards to the next solvent extraction cell with a known method.

FIG. 2 illustrates a solvent extraction step, which conventionally comprises seven equally large cells, but, in accordance with the present invention, it is made up of cells of which the first and last, 15 and 16, are equipped with a pump unit 17 and mixers 18 and 19 plus a normal-size settler 20 outside the mixers. The cells in the middle of the step are the cells 1 shown in FIG. 1.

The liquid transfer pipes from one cell to another are not illustrated here, as they are in themselves known before.

The method described above is suitable for instance for cobalt extraction, but it can also be applied for the solvent extraction of other such metals that require complicated solvent extraction stages.

What is claimed is:

1. A method for reducing the size of a solvent extraction process, comprising:
   equipping a first extraction cell and a last extraction cell with a conventional settler unit; and
   equipping at least one middle extraction cell, after the first and before the last extraction cell, with a settler unit located around at least one mixer unit, wherein a cross-sectional area of the settler unit of the at least one middle extraction cell is less than or equal to one half of the cross-sectional area of either the settler unit of the first extraction cell or the settler unit of the last extraction cell.

2. The method of claim 1, wherein a plurality of picket fences in-part define a plurality of settling regions, each settling region being in contact with at least one mixer, and wherein a dispersion, leaving the settler unit of the at least one middle extraction cell, travels through the plurality of picket fences and settling regions, before separated phases flow into the discharge chute.

3. The method of claim 2, wherein at least one of the plurality of settling regions of at least one middle extraction cell is in contact with a pump unit and at least one mixer unit.

4. The method of claim 1, wherein the shape of the settler unit of the at least one middle extraction cell is essentially rectangular.

5. The method of claim 1, wherein at least one mixer unit also constitutes a pump unit.

6. A solvent extraction cell comprising:
   at least one mixer; and
   a settler unit having a plurality of settling regions, each settling region defined in-part, by a plurality of picket fences, wherein the settler unit is formed around the at least one mixer of the cell, and wherein each settling region is in contact with at least one mixer.

7. The solvent extraction cell of claim 6, wherein a profile of the settler unit of the cell is essentially rectangular.

8. The solvent extraction cell of claim 6, wherein a profile of the settler unit of the cell is essentially square.

9. The solvent extraction cell of claim 6, wherein at least one of the plurality of settling regions is in contact with a pump unit and at least one mixer unit.

10. The solvent extraction cell of claim 6, wherein each of the plurality of picket fences is supported, at least in-part, by a wall of each of two mixers.

11. The solvent extraction cell of claim 6, wherein each of the plurality of picket fences is supported, at least in-part, by a wall of a mixer and a wall of the settler unit.

12. The solvent extraction cell of claim 6, wherein each of the plurality of picket fences is supported, at least in-part, by a wall of a mixer and a wall of a pump unit.

13. The solvent extraction cell of claim 6, wherein a cell pump unit and the at least one mixer are connected to each other by a conduit.

14. The solvent extraction cell of claim 6, wherein at least one mixer also functions as a pump unit.

* * * * *